Nov. 7, 1933.  E. LORCH  1,934,549
DOUGH DIVIDER WITH COMPARTMENT DISK
Filed Nov. 12, 1930   6 Sheets-Sheet 1

Inventor:
Emil Lorch
By Emil Bömelyche
Attorney

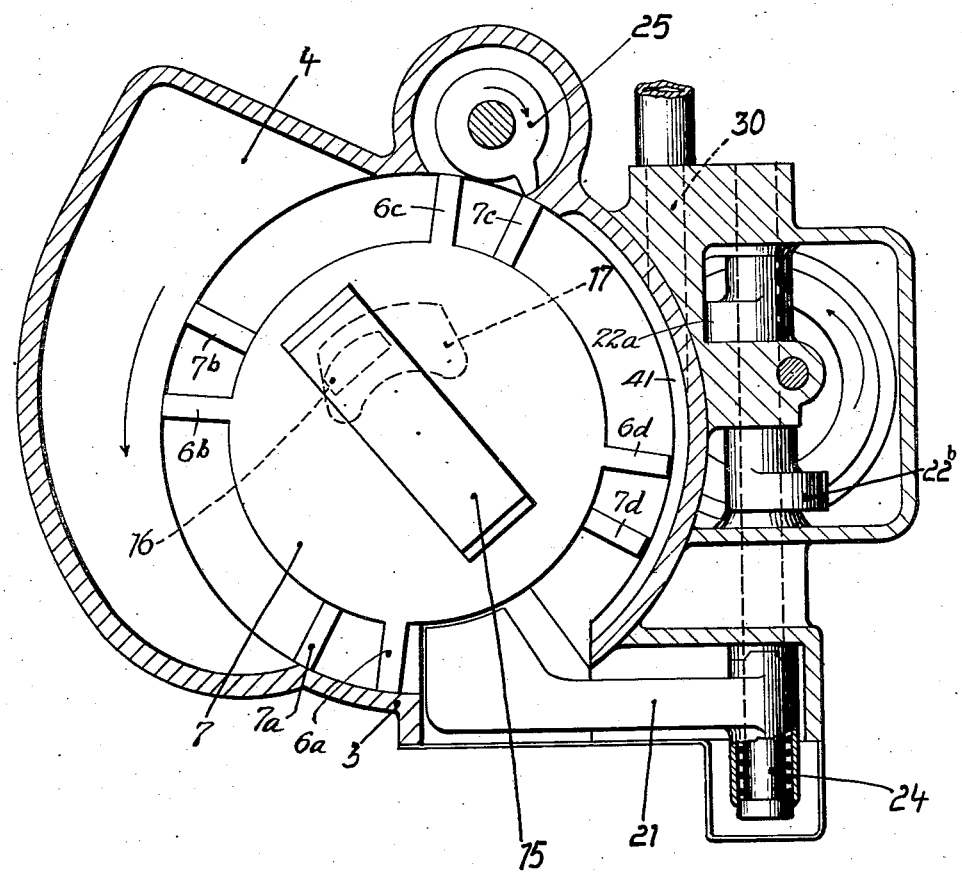

Nov. 7, 1933.  E. LORCH  1,934,549
DOUGH DIVIDER WITH COMPARTMENT DISK
Filed Nov. 12, 1930  6 Sheets-Sheet 3

Inventor:
Emil Lorch
By
Attorney

Nov. 7, 1933.    E. LORCH    1,934,549
DOUGH DIVIDER WITH COMPARTMENT DISK
Filed Nov. 12, 1930    6 Sheets-Sheet 4

Inventor:
Emil Lorch
By
Attorney.

Nov. 7, 1933.  E. LORCH  1,934,549
DOUGH DIVIDER WITH COMPARTMENT DISK
Filed Nov. 12, 1930  6 Sheets-Sheet 5
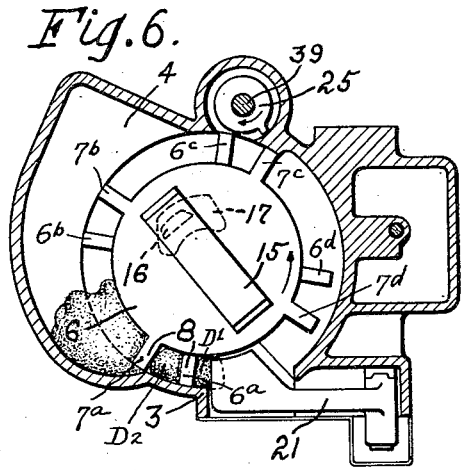
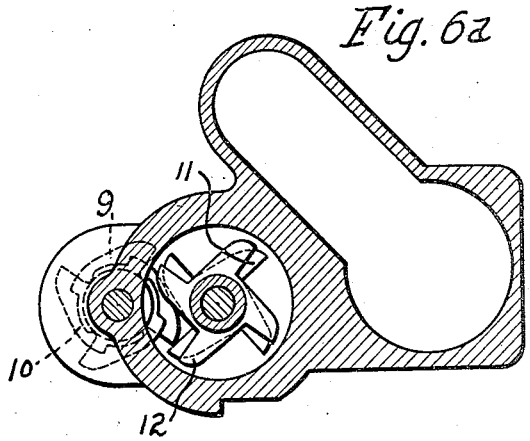
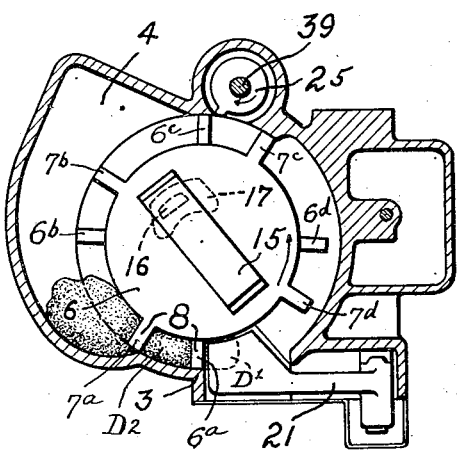
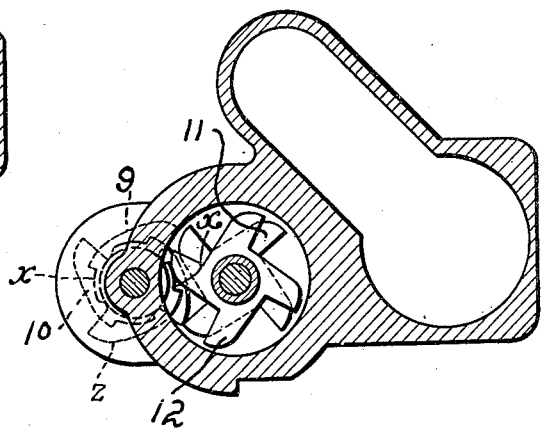
Inventor:
Emil Lorch
By Emil Bönnelycke
Attorney Nov. 7, 1933.      E. LORCH      1,934,549
DOUGH DIVIDER WITH COMPARTMENT DISK
Filed Nov. 12, 1930      6 Sheets-Sheet 6

Inventor:
Emil Lorch
By Emil Börnelyche
Attorney

Patented Nov. 7, 1933

1,934,549

UNITED STATES PATENT OFFICE 1,934,549

DOUGH DIVIDER WITH COMPARTMENT DISK

Emil Lorch, Winnenden, Germany

Application November 12, 1930, Serial No. 495,233, and in Germany September 12, 1930

8 Claims. (Cl. 107—15)

The present invention relates to a dough divider with compartment disk. The known types of dividers of this class are provided with a compartment disk fitted with upright or radially movable cutters which cooperate with a wall of the casing to eject the dough entering the compartments from a hopper and to feed it to the molding machine. However, as the dough is not pressed in the compartments, the cut pieces usually lack uniformity; on the other hand, if special pressing devices, ejecting pistons, and the like are employed, the machine is rendered too complex and expensive, which is a factor of decisive importance, since these machines are intended chiefly for small and medium shops.

It is an object of the invention to provide a machine capable of dividing the dough surely and uniformly and of pressing it preliminarily without involving a too complex design and too high a cost. According to the invention, the dividing device consists of two disks provided with cutters at their circumference and adapted to be coupled alternately and independently of one another with a rotary shaft or with one another to divide the dough and convey it to the outlet. This arrangement affords the advantage of utilizing the entire circumference of the disks to form dividing compartments and of subjecting the dough prior to division to pressing, owing to the stopping of one cutter disk and the rotation of the other, so that all dividing compartments are filled uniformly, provision having been made to vary the size of the compartments and thereby the size and weight of the dough units. To prevent dough, which is not perfectly dry, from clogging up, and interfering with the proper functioning of the device, a special dusting appliance has been provided which automatically and continually powders the cutter disks and the dough between them with flour.

Furthermore, the invention provides a number of safety devices preventing, for instance, excessive or insufficient advance of the dividing disk or breaking of the stripper serving for the ejection of the dough in case of overloading.

By way of example, the invention is illustrated in the accompanying drawings, in which Figure 1 is a vertical section of the upper part of a machine according to the invention; Fig. 2, a section on the line I—I, Fig. 1; Fig. 3, a section on the line II—II, Fig. 1; Fig. 4, a detail view of the cam disk; and Fig. 5, a top view of the machine.

Figs. 6 to 9a are diagrammatic horizontal sections of the machine, showing the parts in different positions assumed in operation in which Figs. 6, 7, 8 and 9 correspond to Fig. 2, and Figs. 6a, 7a, 8a and 9a correspond to Fig. 3.

Figure 1:
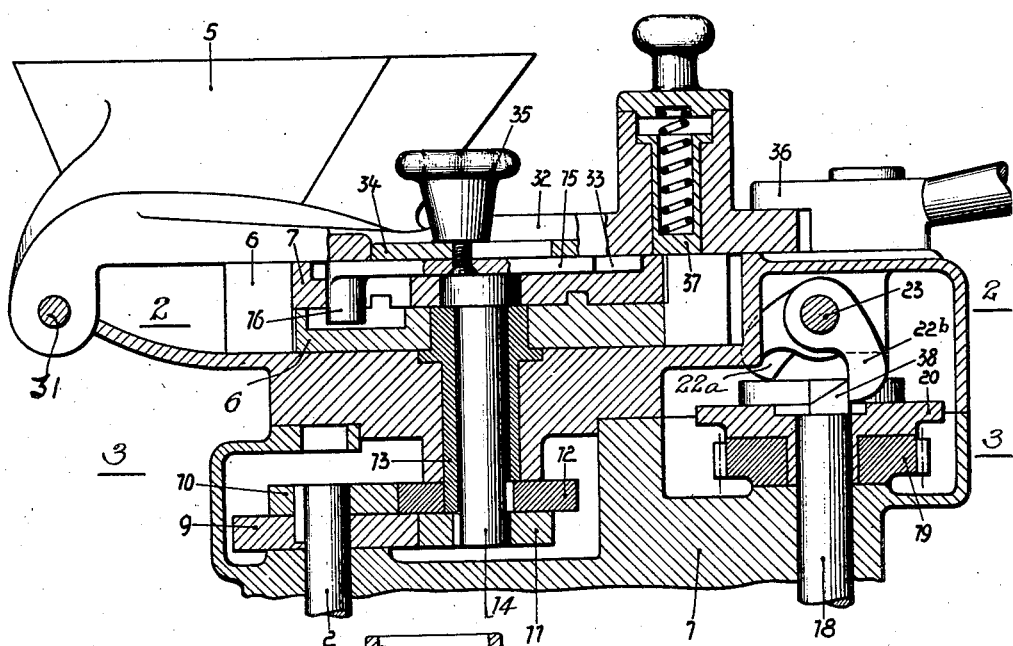
Figure 10:
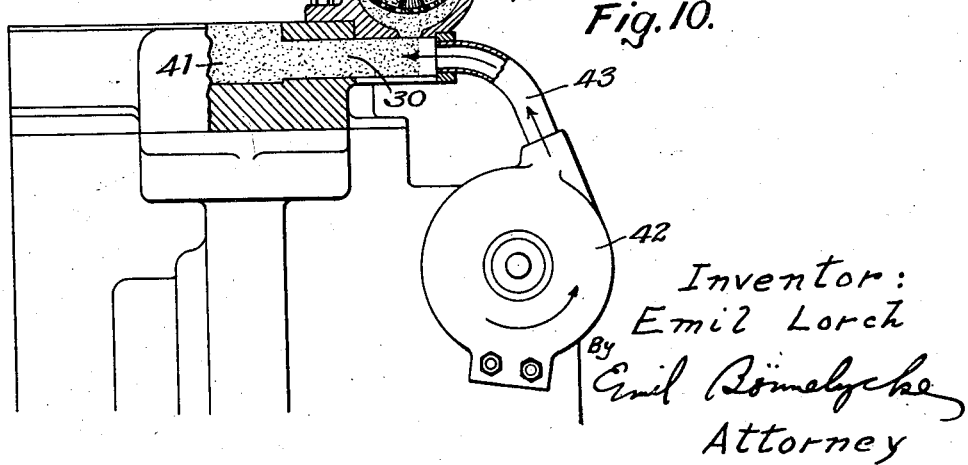
Fig. 10 is a side view partly in section showing the dusting device.
Figure 3:
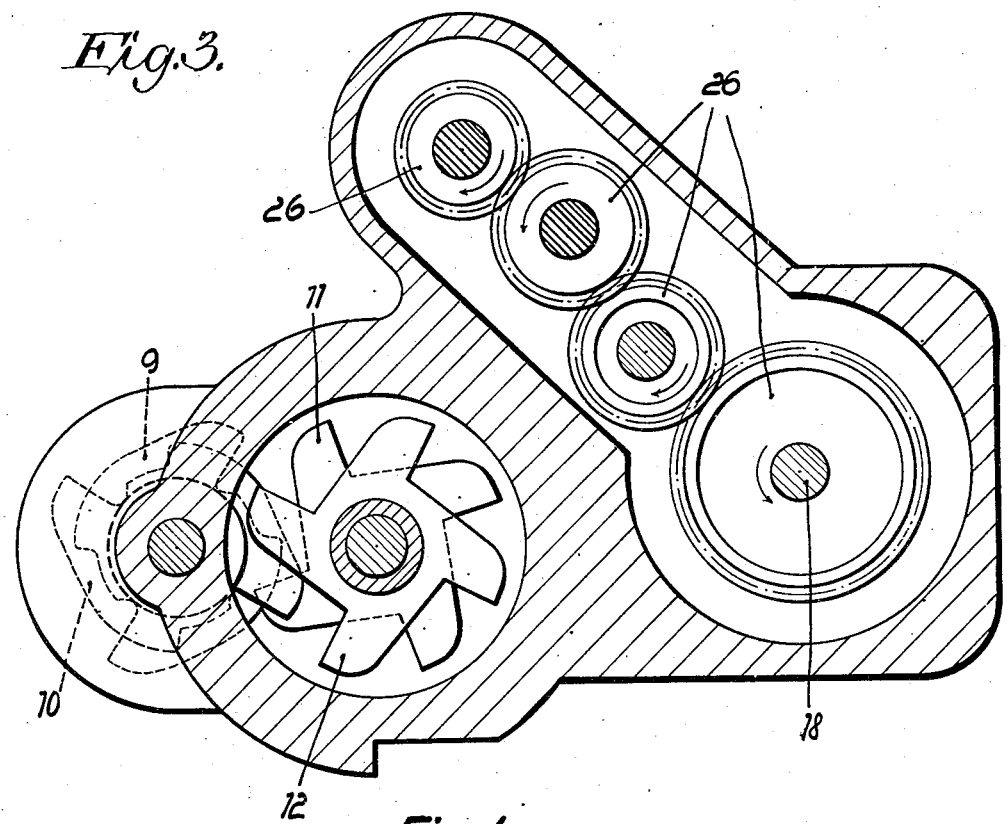

In the machine frame 1 are journaled a vertical main drive shaft 2 and the auxiliary shaft 18. The shaft 2 is driven in any desired manner, for example by a belt drive or an electric motor and in turn by means of a transmission device, not shown here, drives the auxiliary shaft 18. The dividing device is set upon the machine frame. It consists of a cylindrical housing 3 with a spiral extension 4 into which opens the filling hopper 5 which is located on the cover 32 which pivots about the bolt 31. In this housing 3 are located the dividing disks 6 and 7 arranged rotatably about their vertical axis, which are provided at their periphery with a plurality, for example, four shovel shaped knives 8, and these knives fit exactly into the cylindrical housing. The lower one 6 of the dividing disks is rigidly connected with the box-like bolt 13 which is rotatably journaled in the housing 3, whereas the upper dividing disk 7 is seated upon the bolt 14 which in turn passes through the bolt 13 serving as a box for the same and is rotatable therein. At the lower end of each of the two bolts, that is, on the underside of the housing, there is in each case a cam disk 11 and 12. The two ratchet disks 11 and 12, like the two dividing disks 6 and 7, can rotate independently of one another. The driving of the two ratchet disks 11 and 12 and thereby of the dividing disks is accomplished from the main shaft 2 by means of the two ratchet disks 9 and 10 which are like one another, which are displaced 90° with respect to one another and securely fastened to one another and to the main shaft. Thus the upper dividing disk 7 is driven through the two lower ratchet disks 9 and 11 and the lower dividing disk 6 is driven by the two upper ratchet disks 10 and 12.

In a groove 33 of the upper dividing disk 7 a slide 15 is radially guided and may be secured in various positions by clamping against the cover disk 34 by means of a nut or the like 35. Upon the slide 15 is located a carrier stud 16 which engages through the upper dividing disk 7 into a segment-like notch 17 located in the lower dividing disk 6. It limits the movement of the two dividing disks 6 and 7 with respect to one another in that it abuts first against one and then against the other lateral edge of the segment-like notch. By shifting the slide 15 the relative movement between the dividing disks 6 and 7 and thereby the magnitude of the dividing chambers formed between the dividing knives 8 and the wall 3 of the housing may be adjusted for any desired amounts of dough.

The segment-like notch 17 is so formed that the two lateral edges thereof diverge toward the center of the circle, that is, the center of rotation of the knife disks. Thereby an inadvertent shifting of the slide 15 is made difficult.

The cover 32 for closing the housing is secured by means of a friction latch 36 or the like.

Aside from a gear wheel 19 which serves for transmitting motion to the finger disk 25 to be described later, secured to the auxiliary shaft 18 driven from the main shaft 2 by means of gear wheels or the like, there is also fastened to shaft 18 a disk 20 upon which are located two cam-like projections 38 displaced 180° from one another. These projections engage behind two tooth-like stops 22 secured rigidly to the horizontally journaled shaft 23 and in this manner impart a to and fro rotary motion to the shaft 23. Thereby the stripper 21 seated upon the shaft 23 and serving for pushing off the subdivided dough is swung up and down. Inasmuch as the moving of all the parts is accomplished positively, the stripper will strike downwardly each time a subdivided piece of dough is ready to be pushed out. Upon the stripper lever 21 there is located an overload-preventing clutch 24, in order to prevent breakage of the lever upon overloading or becoming stuck.

Now inasmuch as the dividing disk already carried along does not always remain at the same point as a result of the various possibilities of adjustment of the size of the chamber, the finger disk 25 is provided in order to push the dividing disk forward to such extent that a knife will lie at the edge of the space traversed by the stripper 21. Thereby the result is attained that the stripper will correctly strip off the subdivided pieces of dough and no dough will remain hanging. This finger disk 25 is driven from the shaft 18 by means of interposed gear wheels 26. In order to prevent too great forward pushing of the dividing disk the driving ratchet disks are so formed that the radius $x$ located upon the disks 9 and 10 serves as a stop for the lugs of the ratchet disks 11 and 12 and prevents a further turning of the dividing disk in question so long as it must remain stationary for pressing the dough.

The dusting device consists of a roller brush 28 rotating in a flour container 27, which is driven through the drive shaft 39 of the finger disk 25 by means of a worm wheel drive 29. The roller brushes the flour through a sieve 40 which then, by means of an air current from a fan 42 is blown and dusted through the passage 30 upon the dividing disks 6 and 7 and through a notch 41 located upon the side wall of the housing against the stripper.

Figure 8:
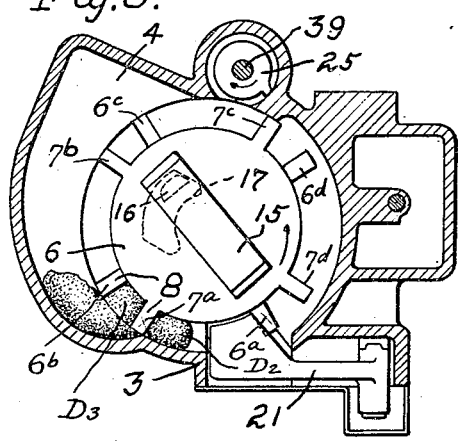
Figure 8A:
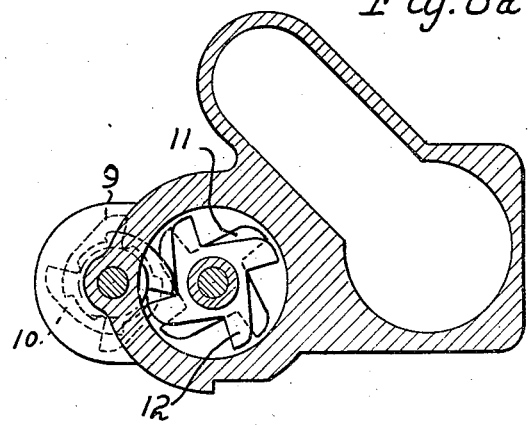
Figure 9:
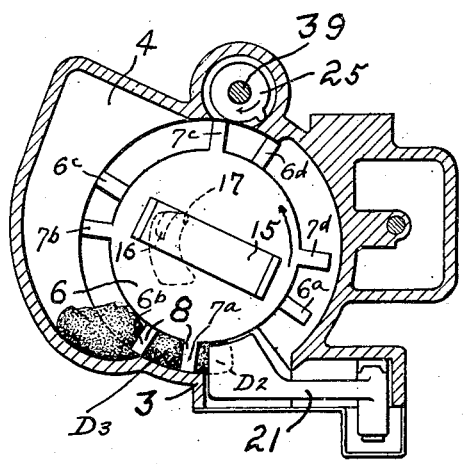
Figure 9A:
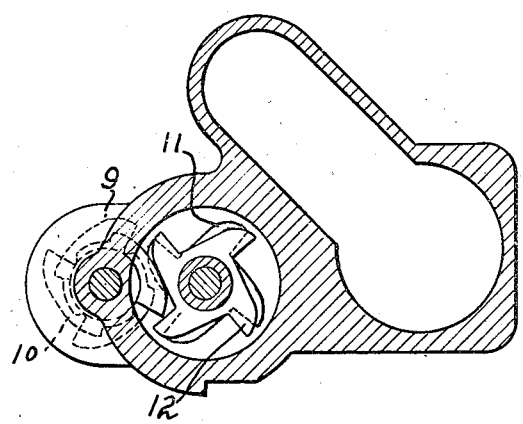

In the position which corresponds to Fig. 6 a piece of dough D2 is just being pressed between the vanes 6a and 7a, while a piece of dough D1 which has already been completely pressed is in front of the vane 6a. If now the main shaft and thereby also the ratchet disks 9 and 10 rotate, for a short extent neither of the two ratchet disks 11 and 12 is carried along, namely for the reason that the ratchet disks 9 and 10 do not engage in the disks 11 and 12. The upper disk 12 is out of contact with the disk 10, whereas the lower ratchet disk 11 lies upon that portion of the ratchet disk 9 which is designated by Z and slides thereon. The result is that the two ratchet disks 11 and 12 and thereby also the knives 7 and 6 remain at rest. Meanwhile, the finger disk 25 also turns, engages with its finger in the path of the dividing knives, strikes upon the knife 6c and shifts the lower knife disk to such extent that the knife 6a will attain the rim of the space traversed by the stripper 21. The portion X of the ratchet disk 10 against which abuts the lug of the disk 12 serves as a safety stop preventing excessive rotation. This serves to prevent the knife 6a from passing under the stripper 21 whereby the latter would remain jammed in its next succeeding movement. The lug of the disk 12 then for a time slides upon the portion X, so that the knife disk 6 cannot rotate further. Inasmuch as the knife 7a is stationary during the engagement of the finger disk 25, the chamber formed by the vanes 6a and 7a is increased by the shifting of the knife 6c, and thereby of the disk 6 and the pressing of the piece of dough D2 is discontinued and completed. The knife disks and the ratchet disks at this moment have reached the positions shown in Figs. 7 and 7a. Now the stripper is swung downwardly in the manner already earlier explained. It thereby pushes the piece of dough D1 lying beneath it downwardly, so that the latter falls into the discharge upon a conveyor belt or the like. The stripper immediately returns to its original position. Meanwhile, the main shaft has rotated further, and carries along the upper ratchet disk 12 by means of the ratchet disk 10. Thereby simultaneously the lower knife disk 6 turns and comes into the position illustrated in Fig. 8. Meanwhile, the ratchet disk 11 has abutted against the radius Z of the ratchet disk 9 so that it could not turn further. As a result the upper knife disk 7 and therewith the knife 7a have remained stationary in their positions. Upon rotation of the lower knife disk 6 the knife 6b moves toward the knife 7a, grips a certain amount of dough and pushes this to the knife 7a. The magnitude of the dough chamber formed in this procedure, at present still open on one side, is conditioned by the path which the actuator 16 can execute in the segment-like cut-out portion 17 of the lower knife disk. This travel, as already noted elsewhere, may be varied by shifting the slide 15. The knives of the two knife disks thus approach one another only until the driver pin 16 abuts against the outer edge of the segment-like cut-out portion 17. The upper ratchet disk 12 and therewith the lower knife disk 6 are now turned further. Since the actuator 16 abuts against the rear edge of the segmental cut-out portion 17, the upper knife disk 7 is now carried along, that is, both knife disks move simultaneously, until they reach the position shown in Fig. 9. A piece of dough D2 thereby is pushed under the stripper 21, while the chamber formed by the knives 7a and 6b, in which the piece of dough D3 is located, is closed by the cylindrical portion of the housing. Thereby the piece of dough D3 is given the requisite compressing. Attention is directed to the fact that this compression is the only one to which the piece of dough is subjected during its passage through the machine. The position shown in Figs. 9 and 9a corresponds to the one illustrated in Figs. 6 and 6a, the only difference being that in the next moment, instead of a knife of the lower disk, as in the first example, now a knife of the upper knife disk 7, namely the knife 7c, is engaged by the finger disk 25 and pushed forward in such manner that the forward edge of the knife 7a will reach the rim of the space traversed by the stripper. Now the stripper can again become active and strip off the piece of dough D2 lying in front of the knife 7a. The alternate actuation of the knife disks thus proceeds in suitable manner.

Figure 4:
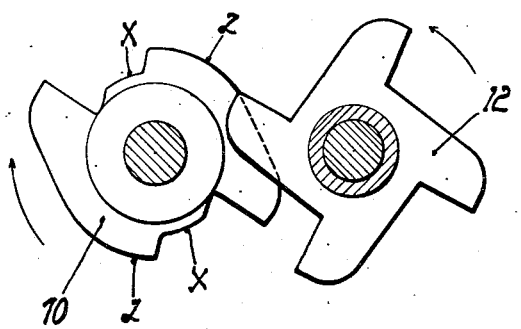
Figure 5:
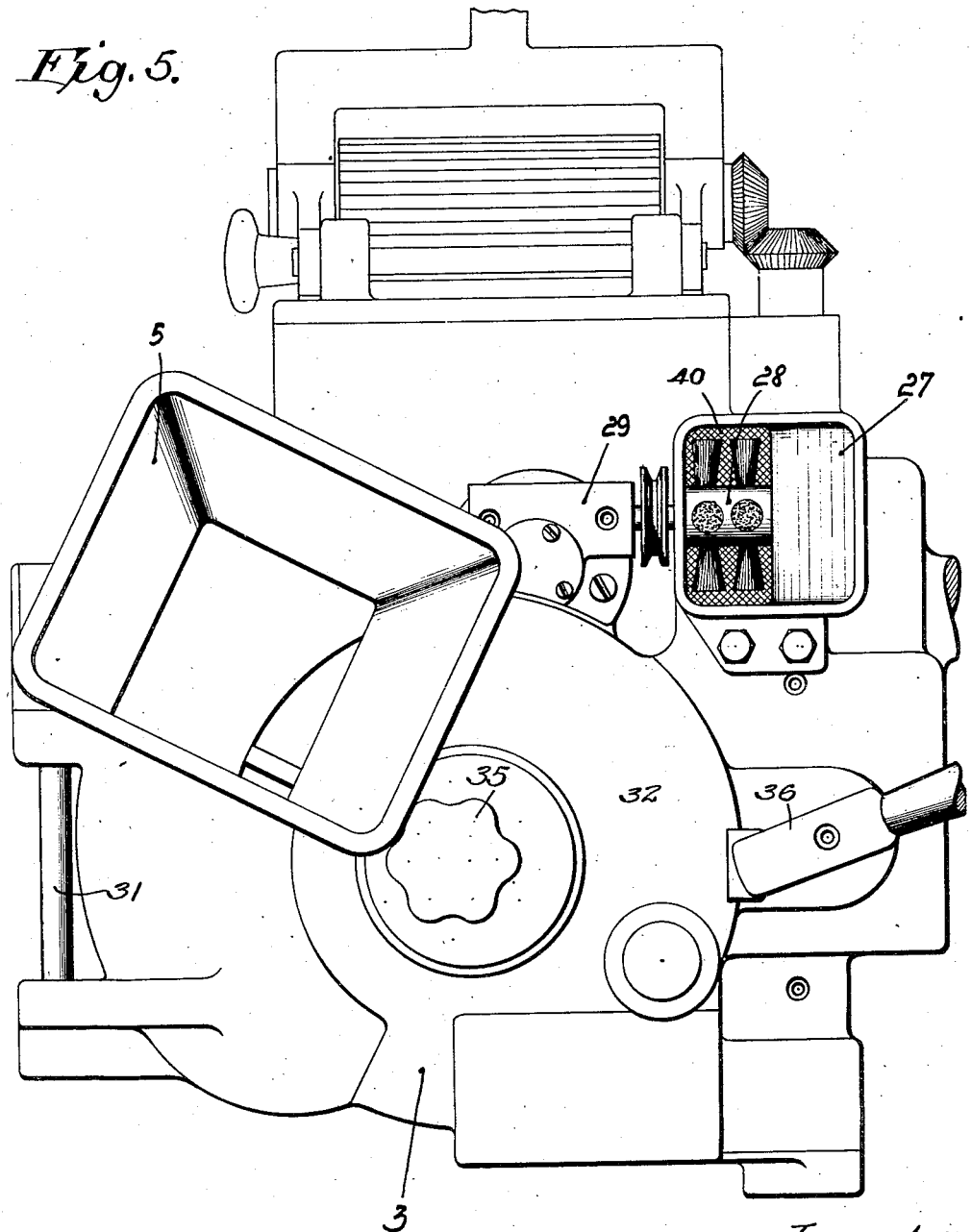

The disks 11 and 12 remain at rest for a certain time—not exactly a quarter turn, but somewhat less—because in the position shown in Fig. 6a the lugs of the disks 9 and 10 do not engage in the lugs of the disks 11 and 12, but instead slide along the same for a certain period. As a result the disks 11 and 12 do not rotate. When the end of one of the lugs or ratchets of the disk 12 abuts against the portion X of the cam disk 10, the cam 12 cannot rotate further, but the cam will slide for a short time upon the part X of the cam disk. It may, therefore, be said that the portion X serves as a stop for the cam and prevents an excessive turning of the cam disk. This may be clearly seen from Fig. 4.

The method of operation of the stripper 21 and the rotating disk 25 is shown more clearly in a perspective view, Fig. 2. Of the two cam-like lugs 38a and 38b upon this disk, at any given time one lug serves the purpose of shifting the tooth 22a to one side and thereby forcing the stripper downward, while the other lug moves the tooth 22b to the other side and thereby again brings the stripper upward into its initial position. Both these motions follow one another rapidly. It should be remarked that these lugs 38a and 38b are not displaced exactly 180°, but only approximately 180°. A small deviation from 180° is necessary in order that both lugs may abut against the teeth 22 not simultaneously but successively. It is, of course, also possible to arrange the lugs 38a and 38b upon a circle lying concentric to the axis of the disk 25, if the teeth have the corresponding position upon the shaft 23. It is not necessary that the stripper should occupy the entire space between two knives, because the dough always hangs together more or less and forms a lump. It suffices if the stripper is moved along as near as possible to the edge of the knife feeding the dough thereto. This may be clearly seen from Figs. 6 to 9a. It would also be practically impossible to make the stripper as broad as a piece of dough, for the reason that the pieces of dough naturally have varying sizes which may be adjusted as desired.

I claim:—

1. A dough dividing machine comprising a recessed casing, a discharge therein for the dough, two dividing disks rotatably disposed one above the other, radial cutters arranged on the said dividing disks and adapted to form dividing chambers between them, means whereby said dividing disks are moved alternately to bring one cutter of the upper disk near the said discharge and to move the lower disk separately to a predetermined degree, the said lower disk being then stopped and the said upper disk rotated alone, a stripper adapted to eject the dough divisions pushed over the discharge by the said lower dividing disk, and means adapted to displace a dividing disk to bring one cutter to the edge of the space covered by the stripper at each dividing operation.

2. A dough dividing machine comprising a recessed casing, a discharge therein for the dough, two dividing disks rotatably disposed one above the other, radial cutters arranged on the said dividing disks and adapted to form dividing chambers between them, means whereby said dividing disks are moved alternately to bring one cutter of the upper disk near the said discharge and to move the lower disk separately to a predetermined degree, the said lower disk being then stopped and the said upper disk rotated alone, a stripper adapted to eject the dough divisions pushed over the discharge by the said lower dividing disk, and a finger disk adapted to displace a dividing disk to bring one cutter to the edge of the space covered by the stripper at each dividing operation.

3. A machine according to claim 1 in which a radially adjustable driver is provided on one of the dividing disks and is adapted to engage a segment like recess in the second dividing disk, the sides of said recess diverging radially to the center point of the disk to prevent the driver from readily shifting spontaneously, and the path of the driver determining the size of the dividing chambers.

4. A machine according to claim 1 in which a machine frame, a driving shaft, and a ratchet disk are provided, the ratchet disk being driven from said shaft by the gearing and having two ratchets adapted to move the said stripper up and down, and in which the stripper is rotatably arranged in the machine frame and is adapted to engage the discharge of the casing.

5. A machine according to claim 1 in which a machine frame, a driving shaft, an overload release coupling, and a ratchet disk are provided, the ratchet disk being driven from the shaft by the gearing and having two ratchets adapted to move the stripper up and down, and in which the stripper is rotatably arranged in the machine frame and is adapted to engage the discharge of the casing and the overload release coupling is connected with the stripper.

6. A machine according to claim 1, in which a plurality of ratchet disks are provided adapted to drive the dividing disks and a plurality of counter ratchet disks, the said ratchet disks driving the dividing disks serving as stops with part of their circumference for the said counter ratchet disks to prevent excessive advance of the dividing disks.

7. A machine according to claim 1 in which one of the disks is recessed and means is provided cooperating with the recess to limit the movement of both disks relative to each other.

8. A dough dividing machine comprising a recessed casing, a discharge therein for the dough, two dividing disks rotatably disposed one above the other, radial cutters arranged on the said dividing disks and adapted to form dividing chambers between them, means whereby said dividing disks are moved alternately to bring one cutter of the upper disk near the said discharge and to move the lower disk separately to a predetermined degree, the said lower disk being then stopped and the said upper disk rotated alone, a stripper adapted to eject the dough divisions pushed over the discharge by the said lower dividing disk, means adapted to displace a dividing disk to bring one cutter to the edge of the space covered by the stripper at each dividing operation, and a dusting device connected with the casing adapted to continually powder the cutter disks with flour.

EMIL LORCH.